3,120,026
PELLETING EXPLOSIVE SOLIDS
Edward J. Russell and William J. Carroll, Jr., Allentown, and Michael E. Kush, Bethlehem, Pa., assignors to Trojan Powder Company, Allentown, Pa., a corporation
Filed Jan. 13, 1961, Ser. No. 82,482
1 Claim. (Cl. 18—2.6)

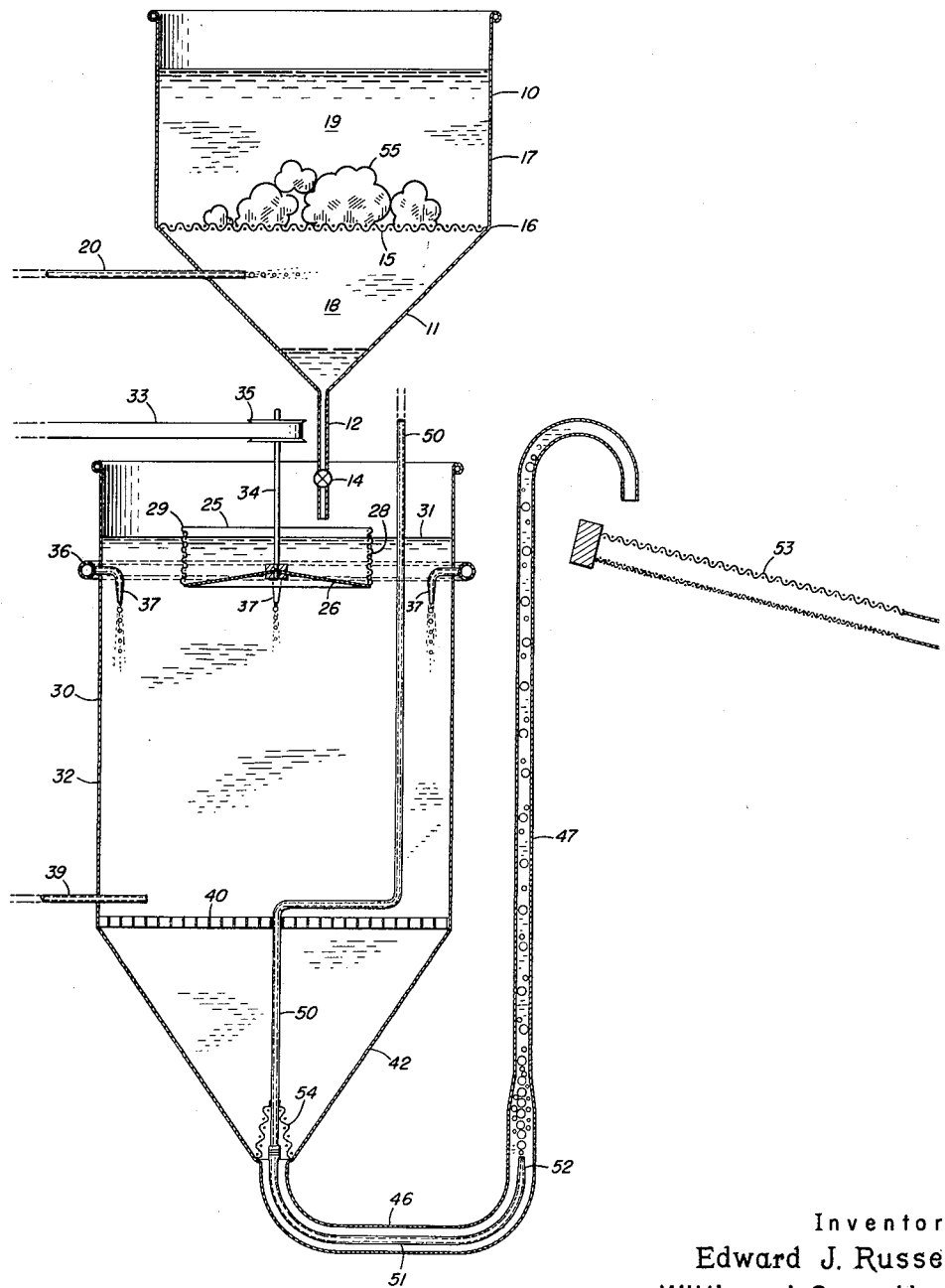

This invention relates to pelleting and has for its principal object the provision of a method and apparatus for pelleting a wide variety of solid materials, both inorganic and organic, whether fully fusible, as for example, TNT, or partly so, this group including mixtures which when heated have suspended in the fused matrix finely divided particles of unfused material. Such a method and apparatus is particularly useful in pelleting explosive materials which are insoluble in water and hence the free flowing pellets may be used in wet blast holes as well as in dry holes.

A further object of the invention is to provide means for pelleting molten material by using centrifugal force to discharge drops into a fluid which does not decompose or become highly volatile at the temperature required and which fluid neither dissolves nor reacts with the material being pelleted.

A still further object of the invention is to provide means for slowly melting a solid, discharging the molten material to a basket rotating about a vertical or tilted axis partly or wholly within the liquid of a tank of sufficient height that the droplets discharged from the basket become generally spherical before reaching the bottom of the tank from whence they are removed by an air lift to a vibrating screen which separates out the desired size pellets from the coarser and finer materials and from the suspending fluid.

An additional object of the invention is to provide a basket particularly useful in carrying out a pelleting process such as described above.

The figure is an elevation, largely in central cross section.

The optional melting tank 10 at the top of the drawing is about three feet in diameter and about four feet deep including a conical bottom 11 leading to a discharge pipe 12 having a nylon plug valve 14 to control flow from the melting tank. A screen 15 at the junction 16 of the cylindrical portion 17 and the conical bottom 11 divides the melting tank into a smaller space 18 below and a larger space 19 above the screen. Pipe 20 admits live steam to space 18 at about 80 p.s.i. to keep the temperature of the water in space 19 between 195° and 205° F.

The revolving basket receptacle 25 is about 5" deep and 16" in diameter preferably having its solid bottom 26 of rather flat conical shape so the angle below the bottom is between 140° and 160° and its side 28 of six mesh wire screening. The basket is immersed in tank 30 with its circular top 29 about an inch above the liquid level 31 and 6¾" below the top of the tank. The least radial distance from the basket receptacle 25 to the cylindrical wall 32 of the tank 30 is 8" so there is ample space for centrifugal discharge of material from the basket as it is revolved by appropriate mechanism indicated by the belt 33 driving pulley 35 on the central shaft 34 of the basket.

Four steam injectors 37 fed by curved pipe 36 just outside the tank keep the temperature of the water in the tank 30 at the desired degree, between 165° and 175° at the center of the basket level. If the material to be pelleted is dropped directly into the rotating receptacle 25, which is an alternative method, the shaft 34 may be coaxial with the tank and the surface temperature of the water is increased thirty degrees to between 195° and 203°. These injectors are equispaced at 90° and are located about 14" below the top of the tank and therefore about 2" below the bottom of the revolving basket receptacle 25 which is about 12" below the top of the tank 30. Pipe 39 admits cold water at about 50° F.

A coarse screen 40 of floor gratings with openings of 1" x 1½" is placed at the junction of the cylindrical and the inverted conical portions, 32 and 42 respectively. The latter communicates with a 3" outlet 46 which in its vertical portion 47 is preferably somewhat smaller in diameter. A quarter inch air line 50 extends through the tank and the screen 40 and 54, the latter being conical and of wire mesh coarse enough to allow the pipe 50 to be moved freely. The lower end of pipe 50 is connected to a plastic tube 51, the upturned end of which is pointed as at 52 to form an air lift leading to a vibrating screen 53. While not preferred, we may use a short air pipe vertically passing through the curved bend just below the junction with the smaller diameter portion 47.

The process is as follows for pelleting: Chunks of material 55 to be pelleted are dumped into the melting tank 10 and are supported on the screen 15 as they melt and flow as a liquid through the screen and pipe 12 to the basket receptacle 25 which rotates at a speed of from 50 to 350 r.p.m. The molten material is thrown by centrifugal force through the openings in the wire mesh side 28 into the hot water as drops. These drops in their slow descent gradually become spheres which as they pass through the colder water at the bottom harden completely through and so may be lifted without damage by the air lift pipe 50—46 to the separator screen 53 which separates out the desired minus 3 plus 20 spheres. The latter are then air dried. The finer and the coarser portions may also be dried or under certain circumstances may be used in their moist condition.

With molten Composition B which contains about 60% Cyclonite, about 40% TNT and up to 4% wax, from the melt tank 10 at 202–205° F., the surface water temperature in tank 30 at 170–175° F., and the basket 25 rotating at from 80 to 85, averaging 82 r.p.m., the pelleted product was divided about as follows:

| | Percent |
|---|---|
| +3 mesh | 17.74 |
| —3 +20 mesh | 74.96 |
| —20 | 7.30 |

The —3 +20 mesh material is the portion normally used alone in blast holes, especially where there is a water condition. It had an absolute density of 1.65 and a bulk density of 1.045. The +3 mesh material is considered as oversized for some operations but is used in a manner similar to that for the —3 +20 mesh portion in some others. The —20 mesh material is considered as being too fine as it is hard to dry and is not free-flowing. However, this fine material has found ready use in the wet form as an excellent sensitizer for slurries in which capacity it has been shown to be superior to coarser material.

A typical screen analysis, after drying, of the fraction collected as the —3 +20 mesh portion was as follows:

| | Percent |
|---|---|
| +3 mesh | 0.17 |
| —3 +6 mesh | 65.35 |
| —6 +14 | 31.42 |
| —14 +20 | 3.05 |
| —20 | 0.01 |

When Cyclotol (60% Cyclonite and 40% TNT), similar but containing no wax, was used in place of Composition B substantially identical results were obtained.

When molten TNT was used in the equipment under all the above-noted conditions with the single exception that the basket rotated at 55 r.p.m., the product was divided as follows:

|  | Percent |
|---|---|
| +3 mesh | 1.67 |
| −3 +20 | 95.33 |
| −20 | 3.00 |

Here the −3 +20 mesh portion, when dry, had an absolute density of 1.645 and a bulk density of 1.00.

What we claim is:

In a device for pelleting solid materials reduced to molten state, including materials having finely divided unfused particles suspended in the fused matrix, the combination with a tank containing a liquid which is stable in presence of the material, of a receptacle rotatably mounted in the tank with its top about an inch above the liquid level thereof and having a wire mesh cylindrical side coaxial with said tank and spaced inside the tank a radial distance greater than 8" all around to provide ample space for centrifugal discharge of material from the receptacle toward the wall of the tank; said receptacle having a greater diameter than height and a solid bottom of conical shape with the apex upward, the angle subtended by said bottom being between 140° and 160°; means for heating the liquid in the tank to a chosen temperature near the liquid surface and to a lower temperature near the bottom of the tank, means for feeding a molten material, solid at room temperature, to the receptacle, means for rotating the receptacle at a speed to discharge the material through the foraminous side into the surrounding liquid as droplets, said liquid heating means holding the temperature of the liquid so that the droplets will harden into spheres as they sink to the bottom of the tank, a tube leading from the bottom of the tank to a position above the liquid in that tank, a screen proximate the discharge from said tube, and an air lift in the tube for delivering pellets to the screen for separating the pellets into spheres of the desired size.

References Cited in the file of this patent

UNITED STATES PATENTS

| 1,378,084 | Bacon et al. | May 17, 1921 |
| 1,785,533 | Schwantes | Dec. 16, 1930 |
| 1,846,884 | Lohmann | Feb. 23, 1932 |
| 2,208,919 | Winter et al. | July 23, 1940 |
| 2,299,929 | Raynolds | Oct. 27, 1942 |
| 2,439,776 | Klein et al. | Apr. 13, 1948 |
| 2,570,423 | Batchelder et al. | Oct. 9, 1951 |
| 2,633,604 | Allen et al. | Apr. 7, 1953 |
| 2,652,386 | Wallman | Sept. 15, 1953 |
| 2,773,840 | Drew | Dec. 11, 1956 |
| 2,919,184 | Osswald et al. | Dec. 29, 1959 |
| 2,923,033 | Baldwin et al. | Feb. 2, 1960 |
| 2,931,062 | Leaman | Apr. 5, 1960 |
| 2,977,214 | McLellan | Mar. 28, 1961 |